United States Patent
Yao et al.

(10) Patent No.: US 12,437,181 B2
(45) Date of Patent: Oct. 7, 2025

(54) METHODS AND APPARATUS FOR MODIFYING A MACHINE LEARNING MODEL

(71) Applicant: Intel Corporation, Santa Clara, CA (US)

(72) Inventors: Anbang Yao, Beijing (CN); Ping Hu, Beijing (CN); Yangyuxuan Kang, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1103 days.

(21) Appl. No.: 17/041,340

(22) PCT Filed: Dec. 18, 2019

(86) PCT No.: PCT/CN2019/126160
§ 371 (c)(1),
(2) Date: Sep. 24, 2020

(87) PCT Pub. No.: WO2021/120028
PCT Pub. Date: Jun. 24, 2021

(65) Prior Publication Data
US 2023/0093823 A1    Mar. 30, 2023

(51) Int. Cl.
*G06N 3/04* (2023.01)
*G06N 3/08* (2023.01)
*G06N 3/082* (2023.01)

(52) U.S. Cl.
CPC ............... *G06N 3/04* (2013.01); *G06N 3/08* (2013.01); *G06N 3/082* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 10,490,182 B1* | 11/2019 | Madhavaraj | G06N 7/01 |
| 2008/0114710 A1* | 5/2008 | Pucher | G06N 20/00 |
| | | | 706/20 |

(Continued)

FOREIGN PATENT DOCUMENTS

| | | |
|---|---|---|
| CN | 110188708 | 8/2019 |
| WO | 2018093926 | 5/2018 |
| WO | 2021120028 A1 | 6/2021 |

OTHER PUBLICATIONS

Liu et al., "Deep Learning Face Attributes in the Wild," [https://arxiv.org/pdf/1411.7766v3.pdf], Department of Information Engineering, The Chinese University of Hong Kong, Department of Electronic Engineering, The Chinese University of Hong Kong, Sep. 24, 2015, 11 pages.

(Continued)

*Primary Examiner* — Ryan C Vaughn
(74) *Attorney, Agent, or Firm* — Hanley, Flight & Zimmerman, LLC

(57) ABSTRACT

Methods, apparatus, systems, and articles of manufacture for modifying a machine learning model are disclosed. An example apparatus includes a supervised branch inserter to insert a supervised branch into a machine learning model at an identified location, a first cluster generator to generate a first cluster of the inserted supervised branch using a first clustering technique, a second cluster generator to generate a second cluster of the inserted supervised branch using a second clustering technique, the second clustering technique different from the first clustering technique, a cluster joiner to join the first cluster and the second cluster to form a clustering block, the clustering block appended to an end of the supervised branch, and a propagation strategy executor to execute a propagation training strategy to modify a parameter of the machine learning model.

19 Claims, 9 Drawing Sheets

(56) References Cited

U.S. PATENT DOCUMENTS

| | | |
|---|---|---|
| 2017/0256254 A1 | 9/2017 | Huang et al. |
| 2018/0032874 A1* | 2/2018 | Sánchez Charles ..... G06N 7/01 |
| 2018/0060724 A1* | 3/2018 | Wang ..................... G06N 3/045 |
| 2019/0122096 A1 | 4/2019 | Husain |
| 2019/0251184 A1* | 8/2019 | Shan ..................... G06N 3/045 |
| 2019/0325203 A1 | 10/2019 | Yao et al. |
| 2020/0279156 A1 | 9/2020 | Cai et al. |
| 2021/0004572 A1 | 1/2021 | Hu et al. |
| 2021/0019628 A1 | 1/2021 | Yao et al. |
| 2023/0093823 A1 | 3/2023 | Yao |

OTHER PUBLICATIONS

Krizhevsky et al., "ImageNet Classification with Deep Convolutional Neural Networks," [https://papers.nips.cc/paper/4824-imagenet-classification-with-deep-convolutional-neural-networks.pdf], Advances in Neural Information Processing Systems 25 (NIPS 2012), 9 pages.

Kang et al., "Face Attribute Classification Using Attribute-Aware Correlation Map and Gated Convolutional Neural Networks," [https://slsp.kaist.ac.kr/paperdata/Face_attribute_classification.pdf], Korea Advanced Institute of Science and Technology, Department of Electrical Engineering, 5 pages.

Kalayeh et al., "Improving Facial Attribute Prediction using Semantic Segmentation," [https://www.crcv.ucf.edu/papers/cvpr2017/Kalayeh_CVPR2017.pdf], Center for Research in Computer Vision University of Central Florida, 9 pages.

Han et al., "Heterogeneous Face Attribute Estimation: A Deep Multi-Task Learning Approach," [https://arxiv.org/pdf/1706.00906.pdf], IEEE Sep. 28, 2017, 15 pages.

Hand et al., "Attributes for Improved Attributes: A Multi-Task Network Utilizing Implicit and Explicit Relationships for Facial Attribute Classification," [https://www.aaai.org/ocs/index.php/AAAI/AAAI17/paper/viewFile/14749/14282], Proceedings of the Thirty-First AAAI Conference on Artifical Intelligence (AAAI-17), pp. 4068-4074, 7 pages.

He et al., "Deep Residual Learning for Image Recognition," [https://arxiv.org/pdf/1512.03385.pdf], Microsoft Research, Dec. 10, 2015, 12 pages.

Huang et al., "Densely Connected Convolutional Networks," [https://arxiv.org/pdf/1608.06993.pdf], Jan. 28, 2018, 9 pages.

Lee et al., "Deeply-Supervised Nets," [https://arxiv.org/pdf/1409.5185.pdf], Sep. 25, 2014, 10 pages.

Hu et al., "Learning Supervised Scoring Ensemble for Emotion Recognition in the Wild," [https://dl.acm.org/citation.cfm?id=3143009], 2 pages, (Abstract Only).

Zhong et al., "Leveraging Mid-Level Deep Representations for Predicting Face Attributes in the Wild," [https://arxiv.org/pdf/1602.01827.pdf], Computer Science and Communication, KTH Royal Institute of Technology, Jun. 21, 2016, 8 pages.

Zhong et al., "Face Attribute Prediction Usiing Off-the-Shelf CNN Features," [https://arxiv.org/pdf/1602.03935.pdf], Computer Science and Communication, KTH Royal Institute of Technology, Jun. 21, 2016, 9 pages.

Gunther et al., "AFFACT: Alignment-Free Facial Attribute Classification Technique," [https://arxiv.org/pdf/1611.06158.pdf], Vision and Security Technology (VAST) Lab, University of Colorado, Aug. 4, 2017, 10 pages.

International Searching Authority, "Search Report," issued in connection with International Application No. PCT/CN2019/126160, dated Sep. 7, 2020, 4 pages.

International Searching Authority, "Written Opinion" issued in connection with International Application No. PCT/CN2019/126160, dated Sep. 7, 2020, 3 pages.

Patent Cooperation Treaty, "International Preliminary Report on Patentability Chapter I," issued in connection with International Patent Application No. PCT/CN2019/126160, dated Jun. 30, 2022, 5 Pages.

* cited by examiner

METHODS AND APPARATUS FOR MODIFYING A MACHINE LEARNING MODEL

FIELD OF THE DISCLOSURE

This disclosure relates generally to machine learning, and, more particularly, to methods and apparatus for modifying a machine learning model.

BACKGROUND

Machine Learning (ML) is an important enabling technology for the revolution currently underway in artificial intelligence, driving truly remarkable advances in fields such as object detection, image classification, speech recognition, natural language processing, and many more. Within the field of Machine Learning, facial attributes recognition (FAR) is used to identify facial attributes of a person(s) appearing in an image. FAR aims to recognize emotion, age, gender, hair style and other facial attributes (brow style, eye style, etc.) all at once.

BRIEF DESCRIPTION OF THE DRAWINGS

The figures are not to scale. In general, the same reference numbers will be used throughout the drawing(s) and accompanying written description to refer to the same or like parts.

Figure 1:
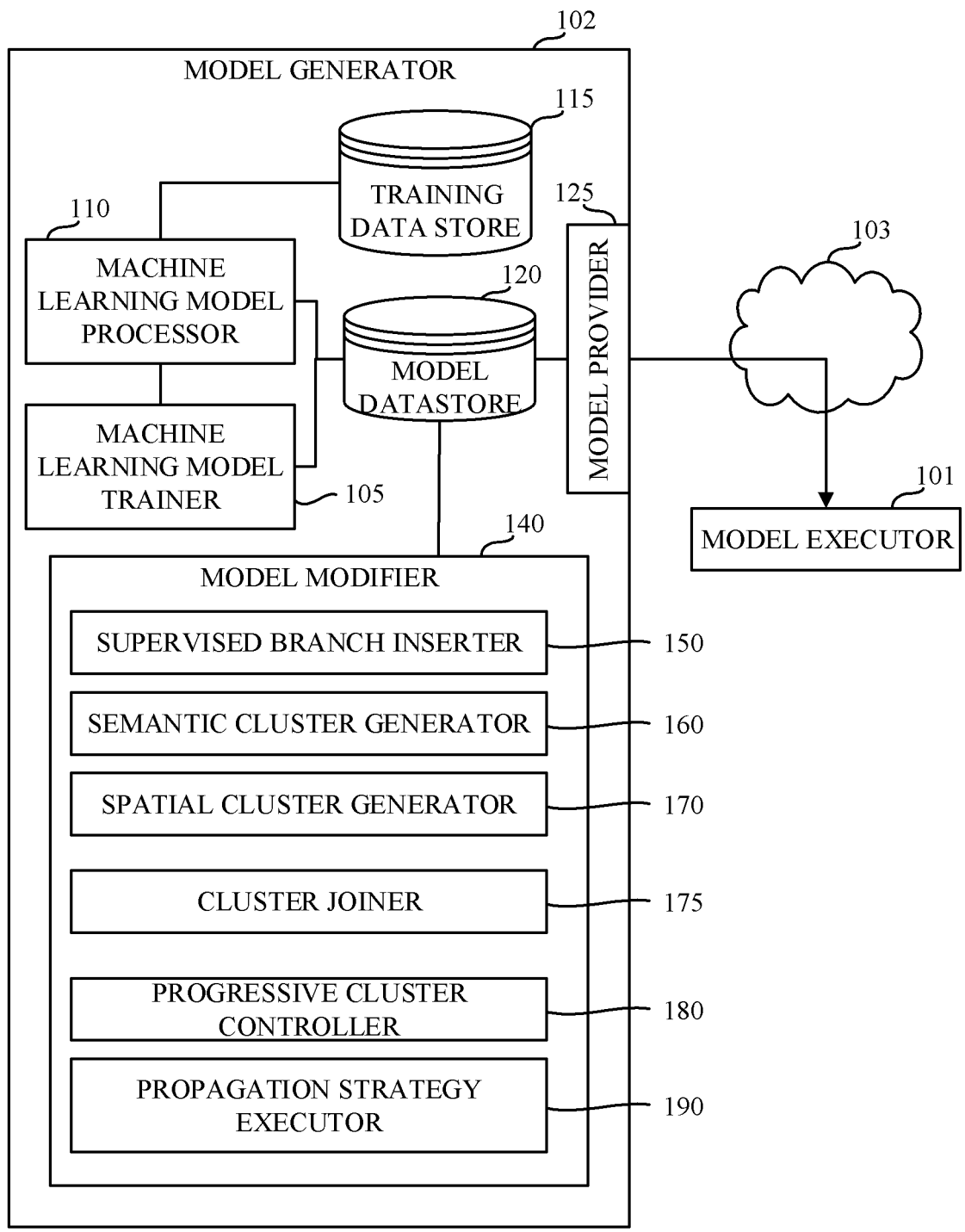
FIG. 1 is a block diagram of an example environment of use including a model executor and a model generator implemented in accordance with teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Facial Attribute Recognition (FAR) has wide potential applications such as biometric identification, augmented reality (AR)/virtual reality (VR), driver assistance system (s), etc. FAR seeks to identify attributes of person(s) appearing in an image. In some examples, an attribute may have an intrinsic relationship with one or more other attributes. For example, a lipstick attribute (e.g., an indicator of whether a person is wearing lipstick) is semantically related to a female attribute, while spatially related to the position of the mouth attribute.

Convolutional neural networks are a particular type of machine learning (ML)/Artificial Intelligence (AI) structure that have become prevalent in FAR systems. A CNN represents features of an attribute from coarse to fine by progressive layers, and finally classifies the attribute as present or not. Technique(s) that bring relationships of attributes within the CNN into consideration, generally achieve higher performance than techniques that do not consider such relationships. In other words, using the presence of a first feature to influence whether another feature may or may not be present increases the efficiency of such a FAR system, as opposed to systems that treat each feature individually.

In examples disclosed herein, Deeply-supervised Relations Clustering in a Progressive way (DRCP) is applied to a trained machine learning model (e.g., a CNN) to increase FAR accuracy with no additional computational cost to inference. Such an approach appends supervision over multi-scale feature layers and encodes rich context relations of facial attributes by progressive clustering.

In a backbone network (e.g., a trained machine learning model), supervised branches are inserted into layers, from shallow to deep. Joint clustering is then used to cluster each block in each supervised branch. Joint clustering clusters FAR tasks by jointly combining their spatial and semantic relations corresponding to each supervised stage. Joint clustering enriches a backbone's features before each supervised stage and provides a unified operation for all supervised branches to evolve. Next, progressive clustering is performed for each block in the supervised branches. From shallow to deep layers in the network, rich spatial messages are reduced while meaningful semantic information is increased. As a result, combining the strategies in joint clustering blocks among all supervised branches results in a progressive evolution of the network. Clustering with spatial relations plays a leading role in shallow stage(s). Clustering based on spatial relationships is then weakened until clustering based on semantic relationships is used in deeper stage(s). A propagation training strategy for the backbone network is then applied in an end-to-end manner. As a result, the spatial and semantic relations among attributes can be considered sufficiently at different stages of layers, thus discriminative information contained in the backbone network can be better extracted to achieve increased FAR performance.

FIG. 1 is a block diagram of an example environment of use including a model executor 101 and a model generator 102 implemented in accordance with teachings of this disclosure. In the illustrated example of FIG. 1, the model generator 102 generates a model that is provided to the model executor 101 for execution. In the illustrated example of FIG. 1, the model is provided via a network 103.

The example model executor 101 of the illustrated example of FIG. 1 is implemented by a computing platform such as an Internet of Things (IoT) device, a smartphone, a personal computer, etc. In examples disclosed herein, the example model executor 101 may be utilized by any type of entity such as a corporate institution, a bank, a government, an end user, etc. The example model executor 101 accesses a model generated by the model generator 102 for execution. In some examples, the model is provided to (e.g., pushed to) the model executor 101 by the model generator 102 via the network 103. However, any other approach to providing the model to the model executor 101 may additionally or alternatively be used. In the illustrated example of FIG. 1, a single model executor 101 is shown. However, any number of model executors 101 may additionally or alternatively be used. For example, a model executor 101 may be implemented as an IoT device, of which there may be thousands of devices, millions of devices, etc.

The network 103 of the illustrated example of FIG. 1 is a public network such as the Internet. However, any other network could be used. For example, some or all of the network 103 may be a company's intranet network (e.g., a private network), a user's home network, or a public network (e.g., at a coffee shop). In examples disclosed herein, the network 103 transmits Ethernet communications. However, any other past, present, and/or future communication protocols may additionally or alternatively be used.

In examples disclosed herein, the model generator 102 is implemented by a server. However, any other type of computing platform may additionally or alternatively be used such as a desktop computer, a laptop computer, etc. The example model generator 102 includes a machine learning model trainer 105, a machine learning model processor 110, a training datastore 115, a model datastore 120, a model provider 125, and a model modifier 140.

The example machine learning model trainer 105 of the illustrated example of FIG. 1 performs training of the machine learning model (e.g., a neural network) implemented by the machine learning model processor 110. In examples disclosed herein, training is performed using Stochastic Gradient Descent. However, any other approach to training a machine learning model may additionally or alternatively be used. In examples disclosed herein, the example machine learning model trainer 105 causes the machine learning model processor 110 to process training data (e.g., image(s) and metadata associated therewith, in connection with corresponding indications of features present in those images) and/or a portion thereof using a machine learning model stored in the model data store 120. The example model trainer 105 reviews the output of the machine learning model processor 110 to determine an amount of error of the machine learning model. Based on the amount of error, the example machine learning model trainer 105 determines whether to continue training of the machine learning model. If training is to continue, the machine learning model trainer 105 modifies the model (e.g., modifies the structural layout of the model and/or parameters of the model). Training is then continued until the error is within an error threshold.

The example machine learning model processor 110 of the illustrated example of FIG. 1 executes the machine learning model(s) stored in the machine learning model datastore 120. In examples disclosed herein, the machine learning model is a deep neural network (DNN) model. However, any other past, present, and/or future machine learning model topology(ies) and/or architecture(s) may additionally or alternatively be used such as a convolutional neural network (CNN), or a feed-forward neural network.

The example training data store 115 of the illustrated example of FIG. 1 is implemented by any memory, storage device and/or storage disc for storing data such as flash memory, magnetic media, optical media, etc. Furthermore, the data stored in the example training data store 115 may be in any data format such as binary data, comma delimited data, tab delimited data, structured query language (SQL) structures, etc. While in the illustrated example the training data store 115 is illustrated as a single element, the example training data store 115 and/or any other data storage elements described herein (e.g., the example model datastore 120) may be implemented by any number and/or type(s) of memories. In the illustrated example of FIG. 1, the training data store 115 stores training data (e.g., images) and associated metadata identifying features present in those images that are to be identified by the machine learning model.

The example model datastore 120 of the illustrated example of FIG. 1 is implemented by any memory, storage device and/or storage disc for storing data such as flash memory, magnetic media, optical media, etc. Furthermore, the data stored in the example model datastore 120 may be in any data format such as binary data, comma delimited data, tab delimited data, structured query language (SQL) structures, etc. While in the illustrated example the model datastore 120 is illustrated as a single element, the example model datastore 120 and/or any other data storage elements described herein may be implemented by any number and/or type(s) of memories. In the illustrated example of FIG. 1, the model datastore 120 stores machine learning models created by the machine learning model trainer 105 and/or modified by the model modifier 140.

The example model provider 125 of the illustrated example of FIG. 1 provides a model (e.g., the model trained by the machine learning model trainer 105 and/or the model modified by the model modifier 140) to the model executor 101 via the network 103. In some examples, the model provider 125 provides additional instructions and/or metadata that accompany the model to enable the model executor 101 to execute the model. The example model provider 125 enables the model generator 102 to communicate via the network 103. As such, in some examples, the model provider 125 is implemented using a transceiver (e.g., an Ethernet transceiver, a wireless transceiver, etc.) capable of communicating via the network 103.

The example model modifier 140 of the illustrated example of FIG. 1 modifies a model stored in the example model datastore 120 to improve FAR accuracy of the model. The example model modifier 140 of the illustrated example of FIG. 1 includes a supervised branch inserter 150, a semantic cluster generator 160, a spatial cluster generator 170, a cluster joiner 175, a progressive cluster controller 180, and a propagation strategy executor 190. The example model modifier 140 modifies models stored in the example model datastore 120 to improve FAR accuracy.

The example supervised branch inserter 150 of the illustrated example of FIG. 1 identifies a location(s) in the model for insertion of a supervised branch(es). In examples disclosed herein, the location for insertion of the supervised branch is identified at a transition between two layers. However, a location for insertion of a supervised branch may be identified in any other fashion. For example, a location for insertion of a supervised branch may be identified based on whether the size of inputs for a prior layer match the size of inputs for a subsequent layer. Using the identified location(s) for insertion of supervised branches, the example supervised branch inserter 150 inserts supervised branches.

To unify the network between branches and the backbone network, the inserted supervised branches have the same basic units as the backbone network. For example, if the backbone network is a Residual Neural Network (ResNet), the supervised branch is constructed with residual building blocks. That is, the inserted supervised branches mirror the remainder of the backbone network below the point of insertion. As a result, the complexity of each branch is inverse to the representation ability of backbone layers before the insertion position.

The example semantic cluster generator 160 of the illustrated example of FIG. 1 performs semantic clustering of features included in the inserted supervised branches to identify M categories based on a features semantic correlation matrix. In examples disclosed herein, semantic clustering clusters features based on their semantic similarity to other features.

The example spatial cluster generator 170 of the illustrated example of FIG. 1 performs spatial clustering of features included in the inserted supervised branches. Spatial clustering results in formation of N categories, based on attributes spatial locations being in proximity with each other in the input data, such as attributes gathered near a user's eyes, near a user's nose, etc.

In some examples, the semantic cluster generator 160 and the spatial cluster generator 170 may be referred to as a first cluster generator and a second cluster generator, respectively. While in the illustrated example of FIG. 1, the semantic cluster generator 160 and the spatial cluster generator 170 are illustrated as separate entities, in some examples, the semantic cluster generator 160 and the spatial cluster generator 170 may be implemented using a single cluster generator that is to utilize various clustering techniques (e.g., semantic clustering, spatial clustering, etc.). In such an example, the cluster generator(s) implement means for clustering.

The example cluster joiner 175 of the illustrated example of FIG. 1 performs joint clustering to cluster each block in each supervised branch. Joint clustering clusters FAR tasks by jointly combining their spatial and semantic relationships corresponding to each supervised stage. To that end, the joint clustering performed by the cluster joiner 175 enriches a backbone's features before each supervised stage and provides a unified operation for all supervised branches to evolve. In some examples, the cluster joiner 175 may implement a means for joining.

The example progressive cluster controller 180 of the illustrated example of FIG. 1 performs progressive clustering of the model. For each of the inserted supervised branches, the joint clustering results are expected to be different. These different results typically exhibit the following three features: 1) The number of subsets for clustering increases from shallow stages to deep stages within the network. Since the information included in feature maps changes from subtle to holistic with the deepening of the network, the number of subsets increases for both spatial and semantic clustering respectively. 2) The clustering is chosen as the primary clustering by applying a least error technique. As a result, the primary clustering is gradually changed from spatial clustering to semantic clustering. 3) The joint clustering degrees for each of the supervised branches are different. In examples disclosed herein, parameters P and $\theta_1$ are used to adjust the degree of the merging. P represents the number of top-ranked features with least errors in secondary clustering. Using P, the example progressive cluster controller 180 decides the number of seeds to do re-clustering. $\theta_1$ is the threshold to measure distance. In some examples, the progressive cluster controller 180 implements means for determining.

The example propagation strategy executor 190 of the illustrated example of FIG. 1 executes a propagation training strategy to create the modified model. Since there are multiple supervised branches added to the backbone network with jointly evolving clustering, the propagation strategy is used to train supervised branches efficiently. In examples disclosed herein, the propagation strategy includes three stages. First, the example propagation strategy executor 190 causes the machine learning model trainer 105 to train only the backbone network portion of the model (e.g., excluding the supervised branches and joint clustering blocks). Next, the example propagation strategy executor 190 causes the machine learning model trainer 105 to train the backbone network portion of the model and the supervised branches (but excluding the joint clustering blocks). Finally, the example propagation strategy executor 190 causes the machine learning model trainer 105 to train the entire model. In this manner, the machine learning model is trained sufficiently, with the training of the backbone network predominating the trained parameters of the machine learning model. As a result, the spatial and semantic correlations among features can be considered sufficiently at different levels of abstraction of the model, enabling discriminative information contained in backbone network to be better extracted to improve FAR performance. In some examples, the propagation strategy executor implements means for executing.

In the illustrated example of FIG. 1, the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 are implemented by one or more logic circuit(s) such as one or more hardware processor(s). However, any other type of circuitry may additionally or alternatively be used such as one or more analog or digital circuit(s), logic circuits, programmable processor(s), ASIC(s), PLD(s), FPLD(s), DSP(s), etc. In some examples, the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 are implemented using the same logic circuit (e.g., a same hardware processor). However, the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 may, in some examples, be implemented using any number of discrete components (e.g., logic circuits, hardware processors, etc.).

Figure 2:
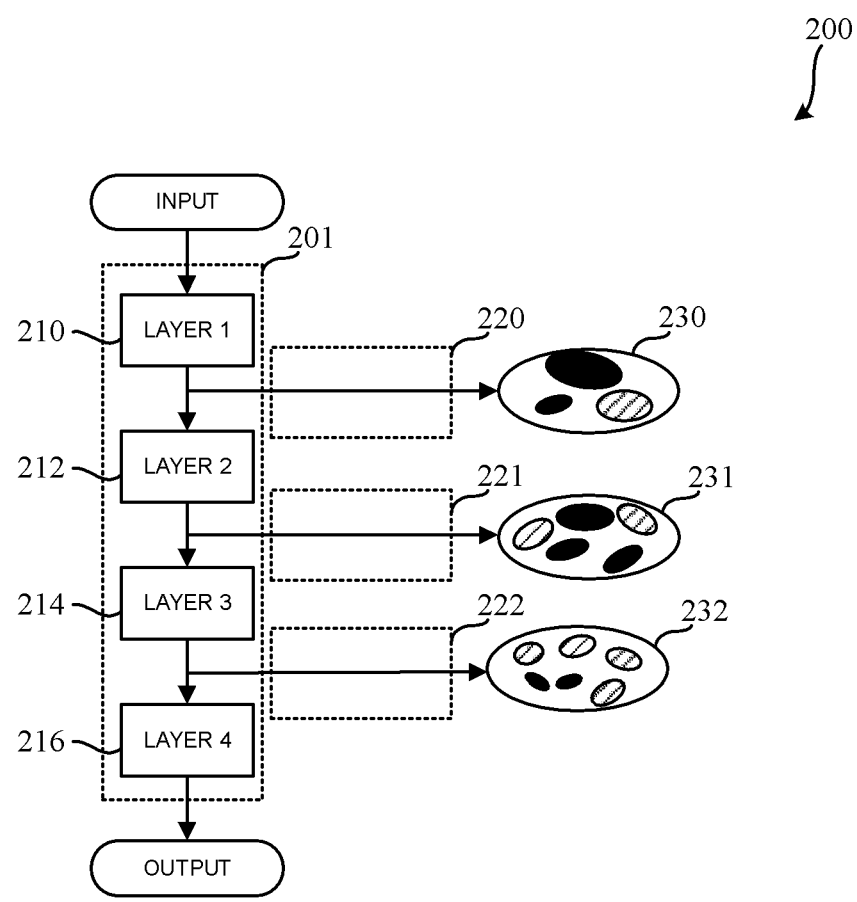
FIG. 2 is diagram illustrating an example progression of a machine learning model modified in accordance with teachings of this disclosure.

FIG. 2 is diagram illustrating an example machine learning model 200 modified in accordance with teachings of this disclosure. The example model 200 includes a backbone network 201. The backbone network includes a first layer 210, a second layer 212, a third layer 214, and a fourth layer 216. The layers of the backbone network represent progressively deeper layers. In the example modified machine learning model 200, a first supervised branch 220, a second supervised branch 221, and a third supervised branch 222 are inserted. Lastly, joint clustering adds a first clustering block 230, a second clustering block 231, and a third clustering block 232 at the end of the first supervised branch 220, the second supervised branch 221, and the third supervised branch 222, respectively.

While an example manner of implementing the model generator 102 is illustrated in FIG. 1, one or more of the elements, processes and/or devices illustrated in FIG. 1 may be combined, divided, re-arranged, omitted, eliminated and/or implemented in any other way. Further, the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 and/or, more generally, the example model generator 102 of FIG. 1 may be implemented by hardware, software, firmware and/or any combination of hardware, software and/or firmware. Thus, for example, any of the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 and/or, more generally, the example model generator 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 and/or, more generally, the example model generator 102 of FIG. 1 is/are hereby expressly defined to include a non-transitory computer readable storage device or storage disk such as a memory, a digital versatile disk (DVD), a compact disk (CD), a Blu-ray™ disk, etc. including the software and/or firmware. Further still, the example model generator 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
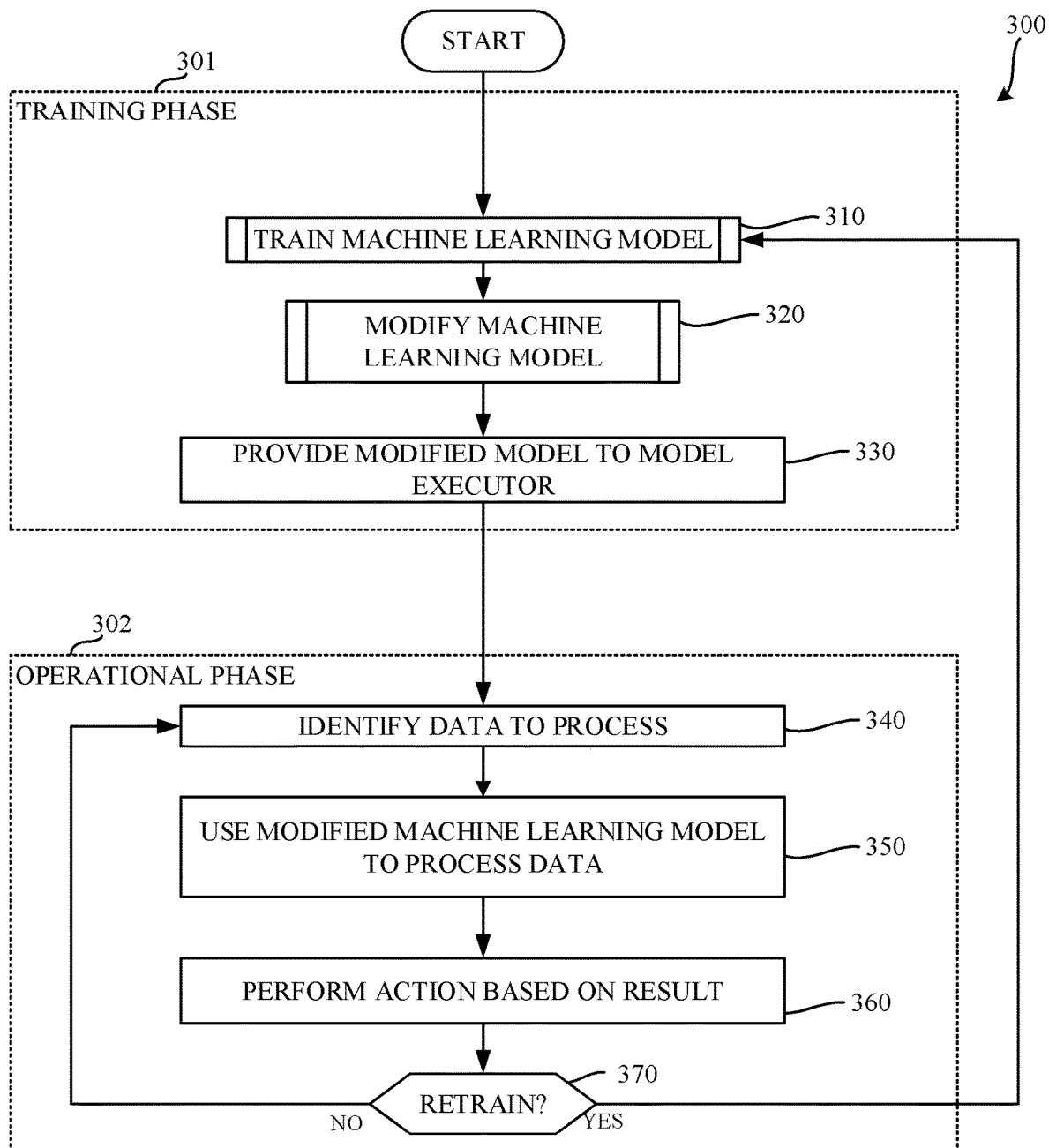
FIG. 3 is a flowchart representative of machine readable instructions which may be executed to implement the example model generator and/or the example model executor of FIG. 1.
Figure 4:
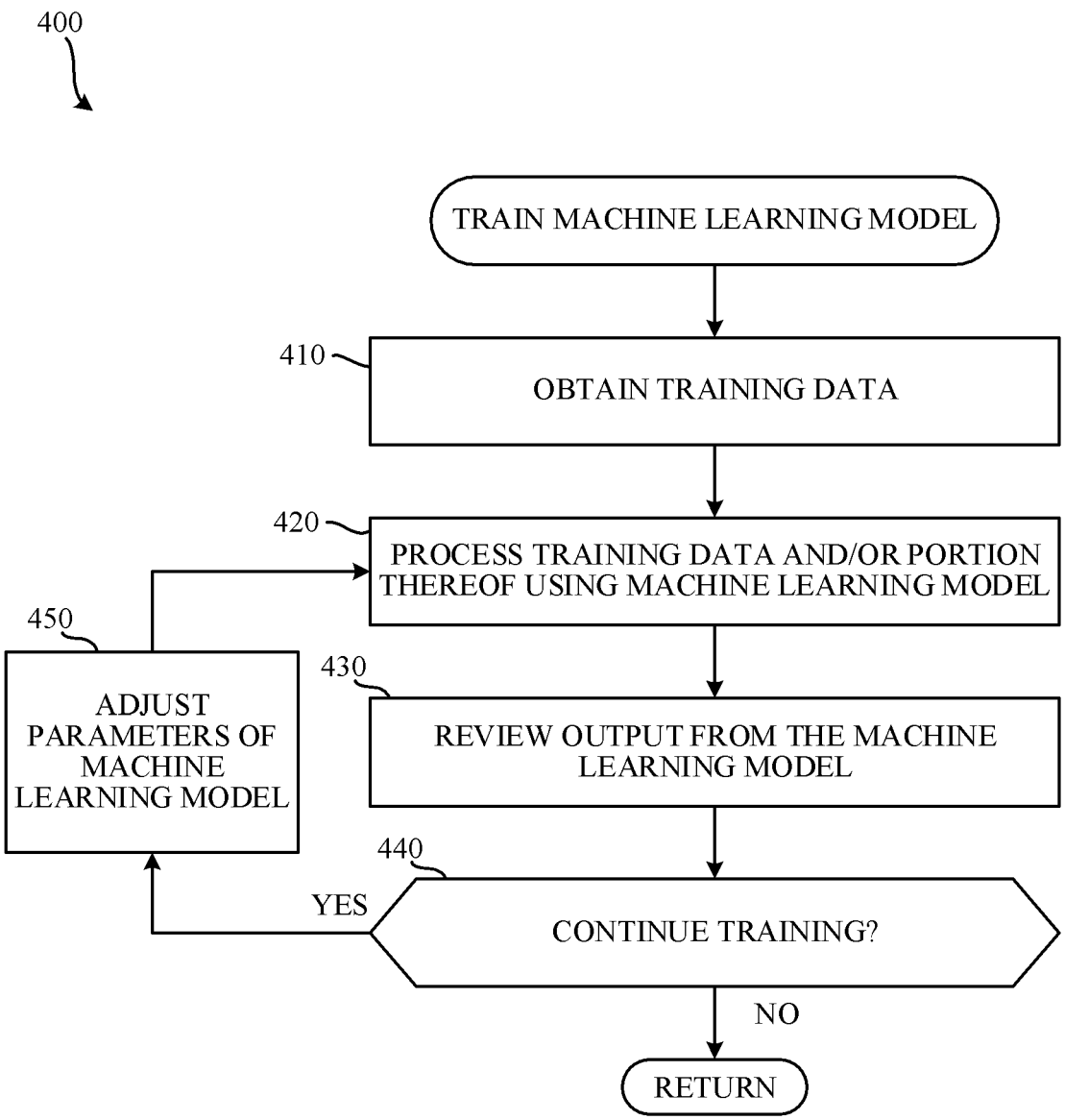
FIG. 4 is a flowchart representative of machine readable instructions which may be executed to implement the example model generator of FIG. 1 to train a machine learning model.

Flowchart(s) representative of example hardware logic, machine readable instructions, hardware implemented state machines, and/or any combination thereof for implementing the example model generator 102 of FIG. 1 are shown in FIGS. 3, 4, and/or 5. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray™ disk, or a memory associated with the processor 912, but the entire program and/or parts thereof could alternatively be executed by a device other than the processor 912 and/or embodied in firmware or dedicated hardware. Further, although the example program is described with reference to the flowchart(s) illustrated in FIGS. 3, 4, and/or 5, many other methods of implementing the example model generator 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, JAVA, C#, PERL, PYTHON, JAVASCRIPT, HyperText Markup Language (HTML), Structured Query Language (SQL), SWIFT, etc.

As mentioned above, the example processes of FIGS. 3, 4, and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions which may be executed to implement the example model generator and/or the example model executor of FIG. 1. In general, implementing a ML/AI system involves two phases, a learning/training phase 301 and an inference phase 302. In the learning/training phase 301, the example machine learning model trainer 105 executes a training algorithm to train a model to operate in accordance with patterns and/or associations based on, for example, training data. (Block 310). An example approach to training a machine learning model is described in further detail in connection with FIG. 4. The example model is then stored in the example model datastore 120. In general, the model includes internal parameters that guide how input data are transformed into output data, such as through a series of nodes and connections within the model to transform input data into output data. In examples disclosed herein, after the model is trained, the example model modifier 140 modifies the model in accordance with the teaching of this disclosure to improve FAR performance. (Block 320). An example approach to modifying the machine learning model is described in further detail in connection with FIG. 5.

Once training and modification of the model is complete, the example model provider 125 deploys the model for use by the example model executor 101. (Block 330). In examples disclosed herein, the model is deployed as an executable construct that processes an input and provides an output based on the network of nodes and connections defined in the model. The model may be stored at the model executor 101 for local execution of the model or, in some examples, may be retrieved on-demand from the model datastore 120.

The deployed model may be operated in an inference phase 302 to process data. In the inference phase, data to be analyzed (e.g., live data) are identified by the model executor 101. (Block 340). In examples disclosed herein, the input data may be in image including a person's face for analysis and/or identification of features and/or attributes. The example model executor 101 uses the modified model to process the input data and create an output. (Block 350). This inference phase can be thought of as the AI "thinking" to generate the output based on what was learned from the training (e.g., by executing the model to apply the learned patterns and/or associations to the live data). In some examples, input data undergo pre-processing before being used as an input to the machine learning model. Moreover, in some examples, the output data may undergo post-processing after they are generated by the AI model to transform the output into a useful result (e.g., a display of data, an instruction to be executed by a machine, etc.). The example model executor 101 then performs a responsive action based on the result of the analysis. (Block 360). In some examples, the responsive action may be displaying a list of features in association with person identified in the input data (e.g., a person appearing in an image).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model. In this manner, the example model executor 101 determines whether the model is to be retrained. (Block 370). If the model is to be retrained (e.g., block 370 returns a result of YES), the example model executor 101 informs the model generator 102 that the model is to be retrained. If the model is not to be retrained (e.g., block 370 returns a result of NO), control returns to block 340 where the example model executor 102 continues to process input data using the model.

While in the illustrated example of FIG. 3, the model executor 101 indicates to the model generator 102 that re-training is to occur, in some examples, the example model generator 102 may determine that re-training is to occur without respect to an indication provided by a model executor. In some examples, a system administrator and/or operator may cause the process 300 of FIG. 3 to be repeated (e.g., to have the model re-trained). In some examples, such subsequent re-training may be based on data learned in prior training iterations.

FIG. 4 is a flowchart representative of machine readable instructions which may be executed to implement the example model generator of FIG. 1 to train a machine learning model. The example program 400 of FIG. 4 begins when the example machine learning model trainer 105 obtains training data. (Block 410). In examples disclosed herein, the training data are stored in the training data store 115. However, the training data may be stored in any other location including, for example, a location remote from the model generator 102. In examples disclosed herein, the training data represent images of user faces and metadata in connection with the features present in the images (e.g., user information/identification, indicators of whether a particular attribute is present in the image, etc.). In examples disclosed herein, the metadata represents sample outputs that are expected to be generated by a trained machine learning model. However, any other type of training data may additionally or alternatively be used.

The example model trainer 105 causes the example model processor 110 to process the training data (e.g., image(s) and metadata associated therewith, in connection with corresponding indications of features present in those images) and/or a portion thereof using the machine learning model stored in the model data store 120. (Block 420). The example model trainer 105 reviews the output of the model processor 110 to determine an amount of error of the machine learning model. (Block 430). For example, the model trainer 105 reviews the outputs of the machine learning model to determine whether the outputs from the model match the sample outputs included in the dataset.

The example model trainer 105 determines whether to continue training. (Block 440). In examples disclosed herein, the example model trainer determines whether to continue training based on whether the calculated amount of error (determined at block 430) exceeds a threshold amount of error. (Block 440). If model training is to proceed (e.g., block 440 returns a result of YES), the example model trainer 105 adjusts parameters of the machine learning model. (Block 450). In some examples, the amount of adjustment to the parameters of the machine learning model is based on the calculated amount of error. Control then proceeds to block 420, where the process of blocks 420 through 450 is repeated until the calculated amount of error is less than the threshold amount of error (e.g., until block 440 returns a result of NO).

Figure 5:
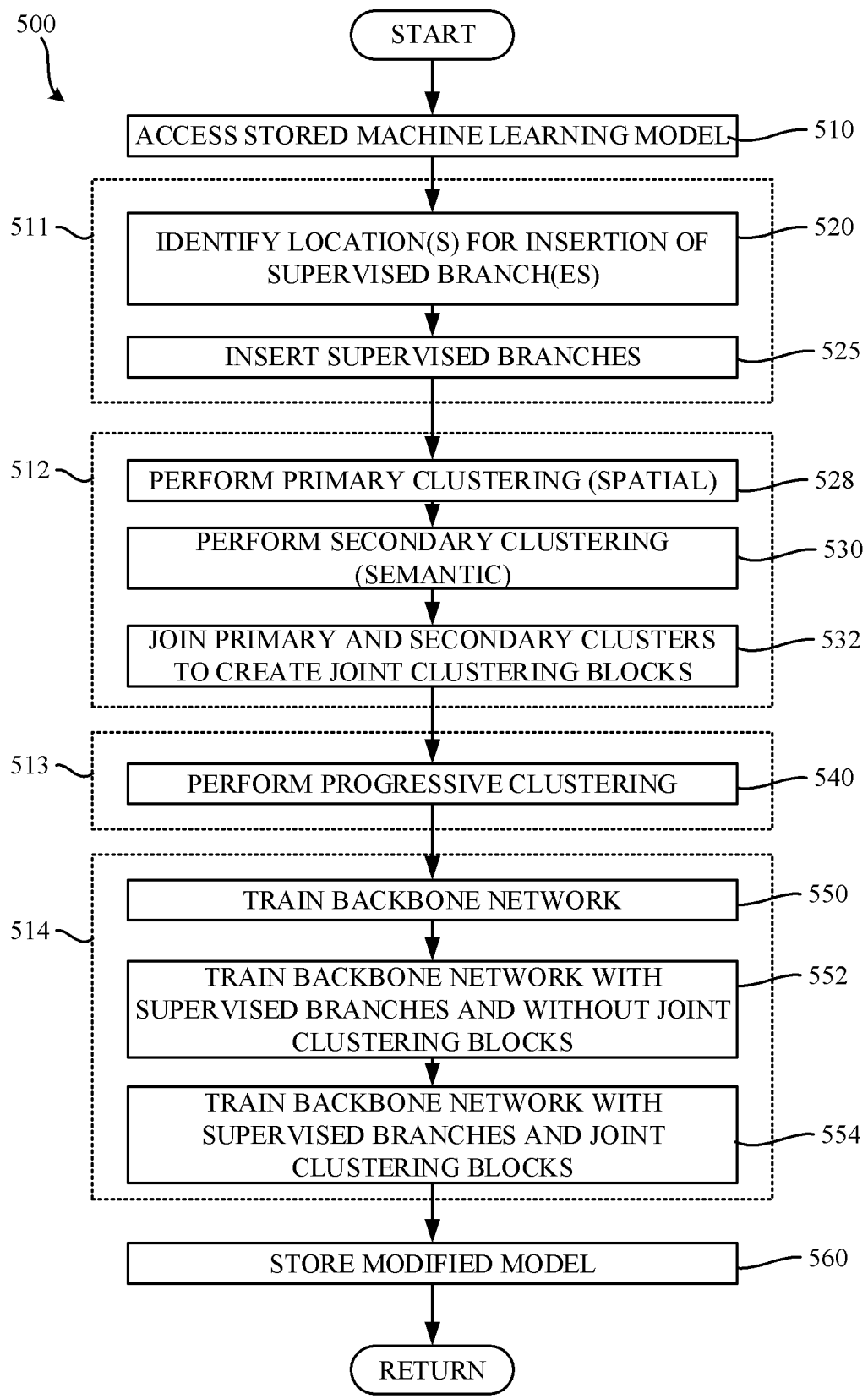
FIG. 5 is a flowchart representative of machine readable instructions which may be executed to implement the example model generator of FIG. 1 to modify a trained machine learning model.

FIG. 5 is a flowchart representative of machine readable instructions which may be executed to implement the example model generator 102 of FIG. 1 to modify a trained machine learning model. The example instructions 500 of the illustrated example of FIG. 5 begin when the example supervised branch inserter 150 accesses the stored machine learning model. (Block 510). In examples disclosed herein, the model is accessed from the model datastore 120. However, the model may be stored at and/or accessed from any other location.

In a machine learning model, regions corresponding to particular features (e.g., features related to detection of facial attributes) vary in size from local (e.g., utilizing a small number of layers and/or nodes to accomplish such feature identification) to holistic (e.g., utilizing a larger number of layers and/or nodes to accomplish such feature identification). Some attributes occupy a small region (e.g., attributes such as the presence of a pointy nose), while other attributes may occupy a larger region (e.g., hair color). The size of the region typically becomes smaller as the layers are located deeper in the backbone network. In some examples, such features may influence whether other features are to be identified. For example, a feature for identifying whether a person in an image is wearing lipstick may be semantically influenced by whether the person in the image is female, as well as be spatially influenced by the position of the person's lips in the image.

To enhance the model for FAR, four phases are executed in the illustrated example of FIG. 5. First, supervised branches are inserted into the model. (Block 511). Joint clustering is then performed to jointly re-cluster a spatial clustering and a semantic clustering of FAR tasks by attributes' spatial and semantic relations for each inserted supervised branch. (Block 512). Progressive clustering is performed to determine a primary and secondary clustering for each joint clustering, as well as decide a merging degree according to their corresponding stages in the backbone network from shallow to deep. (Block 513). A propagation training strategy is then executed to train the inserted supervised branches. (Block 514).

To enable insertion of the supervised branch(es), the example supervised branch inserter 150 identifies a location (s) in the model for insertion of a supervised branch(es). (Block 520). In examples disclosed herein, the location for insertion of the supervised branch is identified at a transition between two layers. However, a location for insertion of a supervised branch may be identified in any other fashion. For example, a location for insertion of a supervised branch may be identified based on whether the size of inputs for a prior layer match the size of inputs for a subsequent layer. Using the identified location(s) for insertion of supervised branches, the example supervised branch inserter 150 inserts supervised branches. (Block 525). An example graphical representation of insertion of supervised branches is described below in connection with FIG. 6.

Figure 6:
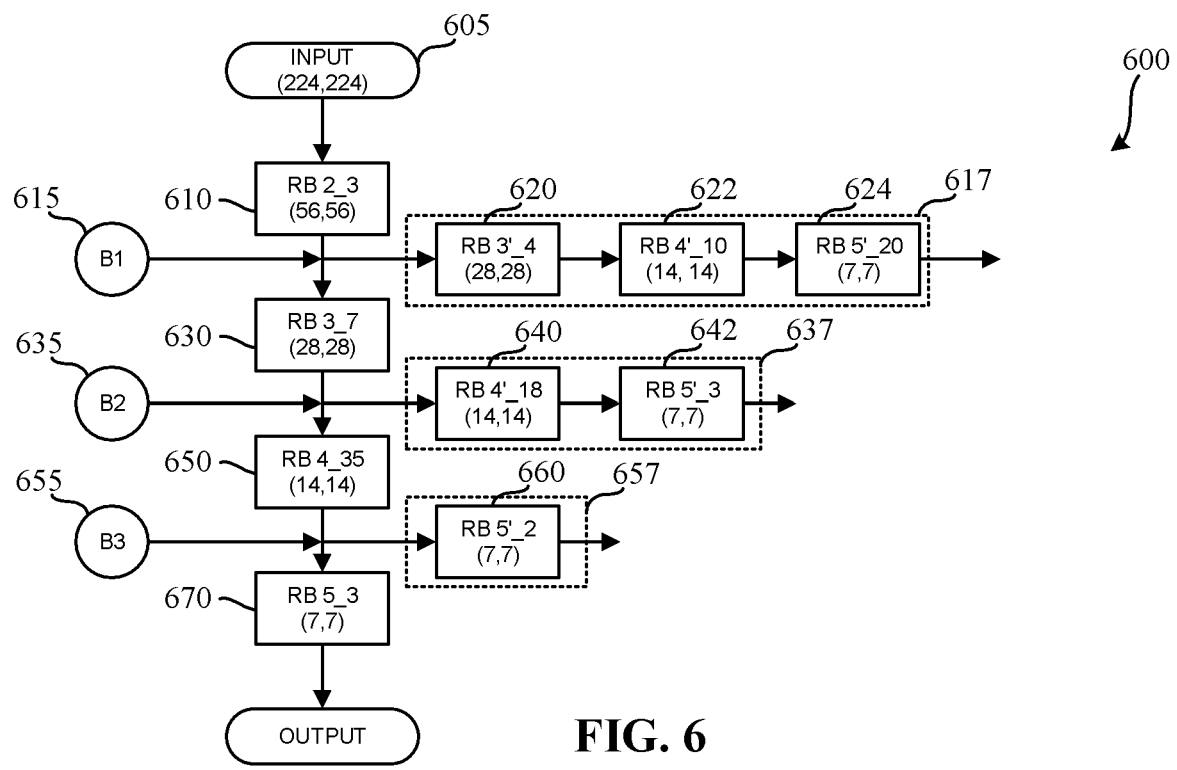
FIG. 6 is a diagram illustrating insertion of supervised branches into a machine learning model.

FIG. 6 is a diagram illustrating insertion of supervised branches into a machine learning model. The example network 600 of FIG. 6 includes an input layer 605, a first original layer 610, a second original layer 630, a third original layer 650, and a fourth original layer 670. As used herein, the first original layer 610, the second original layer 630, the third original layer 650, and the fourth original layer 670 are referred to as the backbone network. In examples disclosed herein, a first location 615, a second location 635, and a third location 655 are identified for insertion of a first supervised branch 617 (corresponding to the first location 615), a second supervised branch 637 (corresponding to the second location 635), and a third supervised branch 657 (corresponding to the third location 655).

The first supervised branch 617 includes a first inserted layer 620, a second inserted layer 622, and a third inserted layer 624. In the illustrated example of FIG. 6, the first inserted layer 620 has a same size as the second original layer 630. The second inserted layer 622 of FIG. 6 has a same size as the third original layer 650. The third inserted layer 624 of FIG. 6 has a same size as fourth original layer 670.

The second supervised branch 637 includes a fourth inserted layer 640 and a fifth inserted layer 642. The fourth inserted layer 640 of FIG. 6 has a same size as the third original layer 650. The fifth inserted layer 642 of FIG. 6 has a same size as the fourth original layer 670.

The third supervised branch 657 includes a sixth inserted layer 660. The sixth inserted layer 660 of FIG. 6 has a same size as fourth original layer 670.

In the illustrated example of FIG. 6, "RB" stands for residual block. For example, an RB of 2_6 would refer to there being six convolutional bottlenecks in the second level residual block. In the illustrated example of FIG. 6, the size of layer is denoted in (X,Y), where X and Y represent sizes of an array (e.g., a tensor) output by the layer. For example, the first original layer 610 has an input size of (224,224) (represented by the output of the input layer 605), and an output size of (56,56). Each layer may have any size input and/or output.

In the illustrated example of FIG. 6, locations for insertion of supervised branches are identified at locations of changes in the size of the inputs and outputs of a layer. For example, the first location 615 represents a point within the model where the layer size transitions from a first size (e.g., the input of the first original layer 610) to a second size (e.g., the output of the first original layer 610). In the illustrated example of FIG. 6, three locations are identified for insertion of supervised branches. However, any number of locations for insertion of supervised branches may additionally or alternatively be identified.

Returning to FIG. 5, the example supervised branch inserter 150 inserts a supervised branch at each identified location. (Block 525). To unify the network between branches and backbone network, the supervised branches have the same basic units as the backbone network. For example, if the backbone network is ResNet, the supervised branch is constructed with residual building blocks. That is, the inserted supervised branches mirror the remainder of the backbone network below the point of insertion. As a result, the complexity of each branch is inverse to the representation ability of backbone layers before the insertion position. Thus, a supervised branch in a shallow stage (e.g., earlier in the modified network) should be larger and/or more complex than the one in a deep stage (e.g., later in the modified network). In examples disclosed herein, the supervised branches are inserted from shallow to deep (e.g., the first supervised branch 617 is inserted first, followed by the second supervised branch 637, followed by the third supervised branch 657, etc.). However, any other order of insertion may additionally or alternatively be used. In the illustrated example of FIG. 6, the supervised branch inserter 150 does not insert a supervised branch after the final layer (e.g., after the fourth original layer 670). Such an approach ensures the dominance of the backbone network and provides full complementarity from all supervised branches.

For each supervised branch, a ground truth and loss function are identified via clustering. (Block 512). In examples disclosed herein, clustering is used to combine tasks within each supervised branch. Examples disclosed herein utilize a joint clustering operation to combine spatial and semantic clustering.

The example spatial cluster generator 170 performs spatial clustering. (Block 528). The example semantic cluster generator 160 performs semantic clustering. (Block 530). In examples disclosed herein, the spatial clustering and semantic clustering are referred to as primary clustering and secondary clustering, respectively. However, any other type(s) of clustering may additionally or alternatively be used. In examples disclosed herein, spatial clustering is performed first, followed by semantic clustering. However, the order of the clustering operations may be reversed. In examples disclosed herein, the second clustering is performed based on the result of the first clustering.

To perform spatial clustering, the example spatial cluster generator 170 utilizes the following equation:

$$D=\{(x_i,y_i)|i\in[1,S]\} \quad \text{Equation 1}$$

In equation 1, above, D represents a training set including S samples. $x_i$ represents the i-th training sample, and $y_i$ is the corresponding ground truth label. As part of the spatial clustering process, the spatial cluster generator 170 causes the machine learning model trainer 105 to train the network (e.g., with the supervised branches inserted) and record the error. Such clustering can be visualized using the diagrams of FIG. 7.

Figure 7:
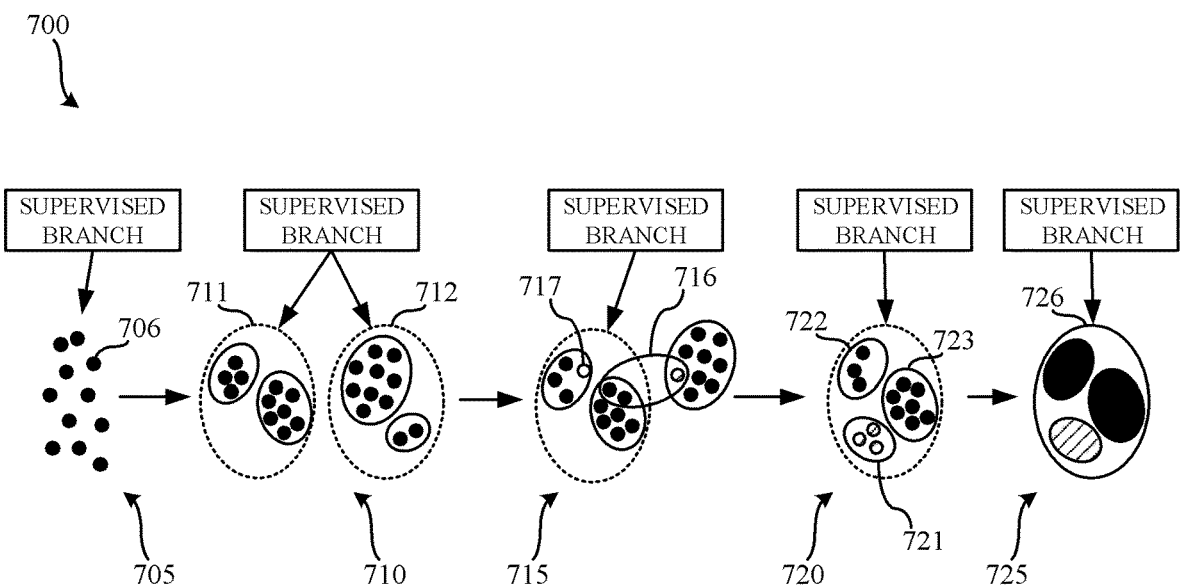
FIG. 7 is a diagram illustrating an example progression of clustering described in connection with the example flowchart of FIG. 5.

FIG. 7 is a collection 700 of diagrams illustrating an example progression of clustering described in connection with the example flowchart of FIG. 5. In the illustrated example of FIG. 7, a first diagram 705 illustrates features of each task without clustering for one joint clustering block, a second diagram 710 represents spatial clustering and semantic clustering of features separately, a third diagram 715 represents the joint clustering of the spatial and semantic clusters, a fourth diagram 720 represents a final clustering result, and a fifth diagram 725 represents a simplified version of the final clustering result.

In the first diagram 705 of FIG. 7, each feature (e.g., feature 706) is represented as $T_i$. The set of all of the features is represented by:

$$T=\{t_i|i\in[1,K]\} \quad \text{Equation 2}$$

Spatial clustering results in formation of N categories, based on attributes spatial locations being in proximity with each other in the input data, such as attributes gathered near a user's eyes, near a user's nose, etc. Spatial clustering utilizes the following equation:

$$T_{sp}=\{T_{sp}(i)\}_{i=1}^{N}$$

$$\text{satisfying } \cup_{i=1}^{N}T_{sp}(i)=T, \forall i,j\in[1,N], T_{sp}(i)\cap T_{sp}(j)=\emptyset \quad \text{Equation 3}$$

In the context of Equation 3, above, $T_{sp}(i)=\{T_{sp(i)_j}|j\in[1,n_i]\}$, which is a subset with $n_i$ features and $\Sigma_{i=1}^{N}n_i=K$, $T_{sp(i)_j}\in T$. The left portion 711 of the second diagram 710 of FIG. 7 illustrates two spatial clusters. The spatial cluster generator 170 causes the machine learning model trainer 105 to train the network using the spatial clustering, and record the error of the model as c($T_{sp}$).

In a similar manner, the semantic cluster generator 160 performs semantic clustering to identify M categories based on a features semantic correlation matrix. In examples disclosed herein, semantic clustering clusters features based on their semantic similarity to other features. Such semantic clustering is denoted as $T_{se} = \{T_{se}(i)\}_{i=1}^{M}$, which is represented by the right portion 712 of the second diagram 710 of FIG. 7. The example semantic cluster generator 160 causes the machine learning model trainer 105 to train the network using the semantic clustering, and record the error of the model as c($T_{se}$).

The example cluster joiner 175 then combines the spatial clusters and the semantic clusters to form joint clusters. (Block 532) Such joint clusters can be represented as:

$$f(T_{sp}, T_{se}): T_{sp}, T_{se} \rightarrow T_{ss} \qquad \text{Equation 4}$$

In examples disclosed herein, spatial clustering $T_{sp}$ is chosen as the primary clustering, and semantic clustering $T_{se}$ is the secondary clustering. However, any other primary/secondary designation may alternatively be used. The features of tasks in $T_{se}$ with least errors are selected to re-cluster $T_{sp}$ by their relations in $T_{se}$. This is shown by the solid outline 716 in the third diagram 715 of FIG. 7. The cluster joiner 175 identifies feature(s) from a first cluster (e.g., $T_{sp}$) that have a distance (e.g., a semantic distance) less than a distance threshold (e.g., $d_{T_{se}} < \theta_1$). In the illustrated example of FIG. 7, this results in the identification of feature 717. The cluster joiner 175 removes the identified feature(s) from $T_{sp}$. The features identified by the solid outline 716 then form a new (first) subset 721 illustrated in the fourth diagram 720 of FIG. 7. A second set 722 and a third set 723 correspond to remaining spatial clustering subsets, while the first subset represents the newly formed semantic clustering subsets. Each of the first, second, and third sets 721, 722, 723 together represent $T_{ss}$, represented by the solid ellipses 726 of the fifth diagram 725 of FIG. 7.

The example progressive cluster controller 180 performs progressive clustering of the model. (Block 540). For each of the inserted supervised branches, the joint clustering results are expected to be different. These different results exhibit the following three features: 1) The number of subsets for clustering increases from shallow stages to deep stages. Since the information included in feature maps changes from subtle to holistic with the deepening of network, the number of subsets increases for both spatial and semantic clustering respectively. 2) The clustering is chosen as the primary clustering by least error. As a result, the primary clustering is gradually changed from spatial clustering to semantic clustering. 3) The joint clustering degrees for each of the supervised branches are different. In examples disclosed herein, parameters P and $\theta_1$ are used to adjust the degree of the merging. P represents the number of top-ranked features with least errors in secondary clustering and it decides the number of seeds to do re-clustering. $\theta_1$ is the threshold to measure distance.

Figure 8:
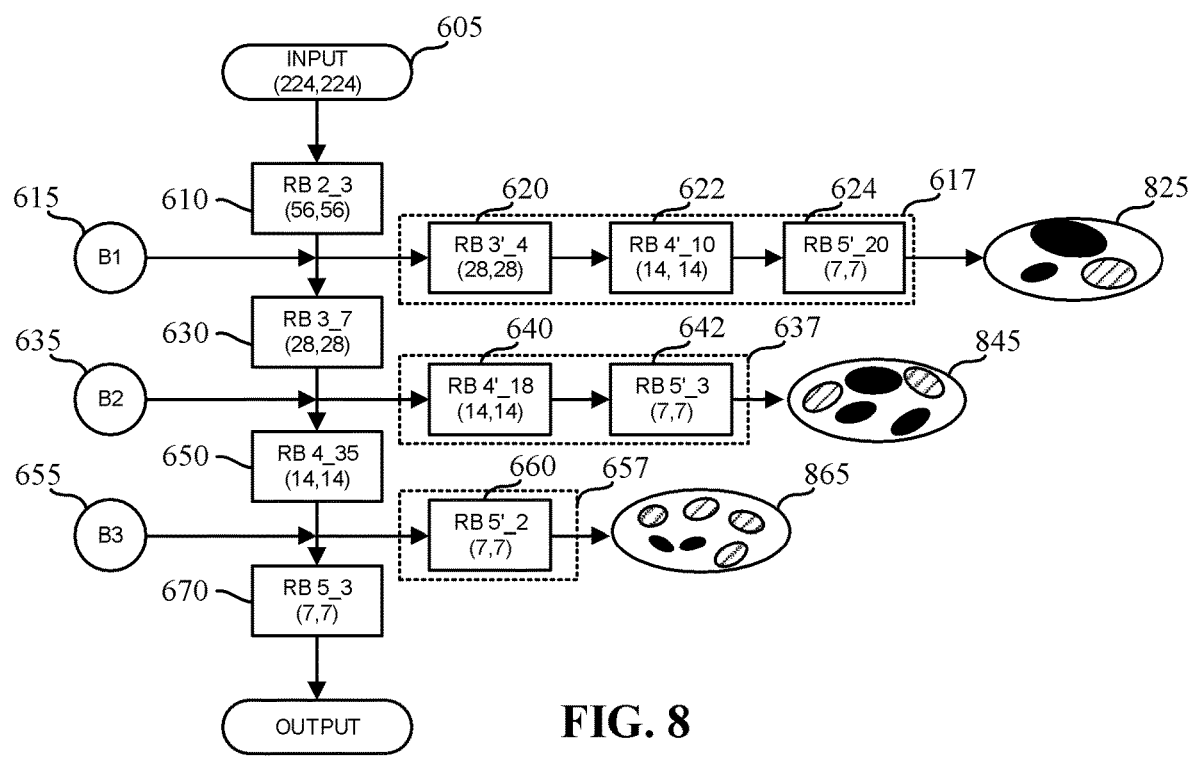
FIG. 8 is a diagram illustrating insertion of supervised branches into a machine learning model, and the creation of clustered blocks at the end of each supervised branch.

As a result of the joint and progressive clustering, clustered blocks are created for each of the supervised branches. FIG. 8 is a diagram illustrating insertion of supervised branches into a machine learning model (e.g., as described above in connection with FIG. 6), and the creation of clustered blocks at the end of each supervised branch. In the illustrated example of FIG. 8, a first clustered block 825 is inserted at the end of the first supervised branch 617, a second clustered block 845 is inserted at the end of the second supervised branch 637, and a third clustered block 865 is inserted at the end of the third supervised branch 657.

The example propagation strategy executor 190 executes a propagation training strategy to create a modified model. (Block 514). Since there are multiple supervised branches added to backbone network with jointly evolving clustering, the propagation strategy is used to train supervised branches efficiently. An example propagation strategy disclosed herein includes three stages. To perform the propagation training strategy, the example propagation strategy executor 190 begins with training only the backbone network (e.g., the network/model without the inclusion of the supervised branches). (Block 550). In some examples, this is referred to as a first feed phase. This first feed training offers basic parameters for the following training phases. In some examples, the training of the backbone network (block 550) may be omitted, such as in examples where the backbone network had already been trained (e.g., in block 310 of FIG. 3). The example propagation strategy executor 190, to implement the training, causes the machine learning model trainer 105 to execute the training process of FIG. 4.

Next, the propagation strategy executor 190 trains the backbone network with the supervised branches, but without the joint clustering blocks. (Block 552). Training in this phase uses the trained model parameters identified in the prior training phase (e.g., the first feed phase of block 550). The example propagation strategy executor 190, to implement this second training, causes the machine learning model trainer 105 to execute the training process of FIG. 4, but using the model with the inserted supervised branches (and not including the joint clustering blocks). This allows the trained parameters of the backbone network to influence the starting state of the trained model. In this manner, the loss operation is not only contained in the backbone network but also included in each supervised branch. As a result, gradients and parameter update are flowed over both the backbone network and the inserted supervised branches. This second training provides a base for computing a joint clustering result.

Lastly, the propagation strategy executor 190 trains the jointly evolving clustering for each supervised branch, including the clustering blocks. (Block 554). The example propagation strategy executor 190, to implement this final training, causes the machine learning model trainer 105 to execute the training process of FIG. 4, but using the entire model (e.g., including the backbone network, the supervised branches, and the clustering blocks). This has the effect of training the entire network sufficiently. As a result, the spatial and semantic correlations among features can be considered sufficiently at different levels of abstraction of the model, enabling discriminative information contained in backbone network to be better extracted to improve FAR performance.

The example propagation strategy executor 190 then stores the modified model in the model datastore 120. (Block 560). In some examples, the modified model is stored in place of the original (e.g., un-modified) model. In this manner, the model can be identified as an updated version of the prior model (e.g., based on a timestamp). However, any other approach to storing the modified model may additionally or alternatively be used.

Figure 9:
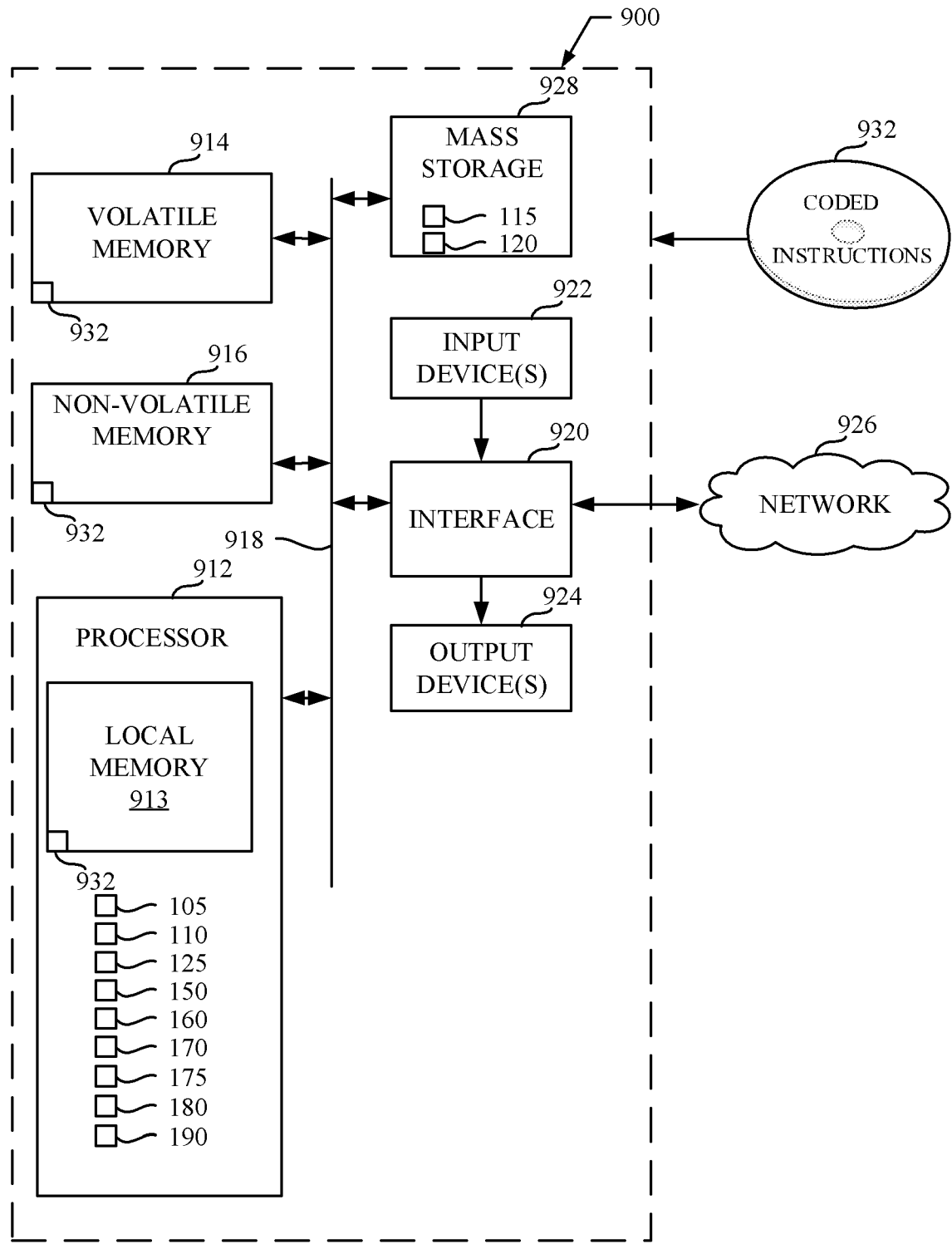
FIG. 9 is a block diagram of an example processing platform structured to execute the instructions of FIGS. 3, 4, and/or 5 to implement the example model generator of FIG. 1.

FIG. 9 is a block diagram of an example processor platform 900 structured to execute the instructions of FIGS. 3, 4, and/or 5 to implement the example model generator 102 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray™ player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example machine learning model trainer 105, the example machine learning model processor 110, the example model provider 125, the example supervised branch inserter 150, the example semantic cluster generator 160, the example spatial cluster generator 170, the example cluster joiner 175, the example progressive cluster controller 180, and/or the example propagation strategy executor 190 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray™ disk drives, redundant array of independent disks (RAID) systems, and digital versatile disk (DVD) drives.

The machine executable instructions 932 of FIGS. 3, 4, and/or 5 may be stored in the mass storage device 928, in the volatile memory 914, in the non-volatile memory 916, and/or on a removable non-transitory computer readable storage medium such as a CD or DVD. In the illustrated example of FIG. 9, the mass storage device 928 implements the example training data store 115 and/or the example model datastore 120.

From the foregoing, it will be appreciated that example methods, apparatus and articles of manufacture have been disclosed that improve FAR accuracy. To substantiate the accuracy, tests compared to existing facial attribute recognition models were performed against the approaches disclosed in the instant application. A test data set containing at least two hundred thousand images from approximately ten thousand users was used. Each image was annotated with binary labels of forty facial attributes. In testing, the example approaches disclosed herein resulted in superior recognition accuracy. For example, in determining whether a user was wearing lipstick, the example approaches disclosed herein improved recognition by 0.6%. Across all facial recognition categories, accuracy was improved by approximately 2%. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 includes an apparatus to modify a machine learning model, the apparatus comprising a supervised branch inserter to insert a supervised branch into a machine learning model at an identified location, a first cluster generator to generate a first cluster of the inserted supervised branch using a first clustering technique, a second cluster generator to generate a second cluster of the inserted supervised branch using a second clustering technique, the second clustering technique different from the first clustering technique, a cluster joiner to join the first cluster and the second cluster to form a clustering block, the clustering block appended to an end of the supervised branch, and a propagation strategy executor to execute a propagation training strategy to modify a parameter of the machine learning model.

Example 2 includes the apparatus of example 1, wherein the first clustering technique includes spatial clustering.

Example 3 includes the apparatus of example 2, wherein the second clustering technique includes semantic clustering.

Example 4 includes the apparatus of example 1, wherein the propagation strategy executor is to cause a machine learning model trainer to train the machine learning model without including the inserted supervised branch and the clustering block, cause the machine learning model trainer to train the machine learning model including the inserted supervised branch and without including the clustering block, and cause the machine learning model trainer to train the machine learning model including the inserted supervised branch and the clustering block.

Example 5 includes the apparatus of example 1, further including a model provider to provide the modified model to a model executor for execution.

Example 6 includes the apparatus of example 1, further including a progressive cluster controller to determine an amount of influence of the first cluster in the joining of the first cluster and the second cluster to form the clustering block.

Example 7 includes the apparatus of example 1, wherein the supervised branch inserter is further to identify the location for insertion of the supervised branch in the machine learning model.

Example 8 includes the apparatus of example 7, wherein the supervised branch inserter is to identify the location at a transition between layers of the machine learning model.

Example 9 includes At least one non-transitory machine readable medium comprising instructions that, when executed, cause at least one processor to at least insert a supervised branch into a machine learning model at an identified location, generate a first cluster of the inserted supervised branch using a first clustering technique, generate a second cluster of the inserted supervised branch using a second clustering technique, the second clustering technique different from the first clustering technique, join the first cluster and the second cluster to form a clustering block, the clustering block appended to an end of the supervised branch, and execute a propagation training strategy to modify a parameter of the machine learning model.

Example 10 includes the at least one non-transitory machine readable medium of example 9, wherein the first clustering technique includes spatial clustering.

Example 11 includes the at least one non-transitory machine readable medium of example 10, wherein the second clustering technique includes semantic clustering.

Example 12 includes the at least one non-transitory machine readable medium of example 9, wherein the instructions, when executed, cause the at least one processor to train the machine learning model without including the inserted supervised branch and the clustering block, train the machine learning model including the inserted supervised branch and without including the clustering block, and train the machine learning model including the inserted supervised branch and the clustering block.

Example 13 includes the at least one non-transitory machine readable medium of example 9, wherein the instructions, when executed, cause the at least one processor to provide the modified model to a model executor for execution.

Example 14 includes the at least one non-transitory machine readable medium of example 9, wherein the instructions, when executed, cause the at least one processor to determine an amount of influence of the first cluster in the joining of the first cluster and the second cluster to form the clustering block.

Example 15 includes the at least one non-transitory machine readable medium of example 9, wherein the instructions, when executed, cause the at least one processor to identify the location for insertion of the supervised branch in the machine learning model.

Example 16 includes the at least one non-transitory machine readable medium of example 15, wherein the instructions, when executed, cause the at least one processor to identify the location at a transition between layers of the machine learning model.

Example 17 includes an apparatus to modify a machine learning model, the apparatus comprising means for inserting a supervised branch into a machine learning model at an identified location, means for generating a first cluster of the inserted supervised branch using a first clustering technique, the means for generating to generate a second cluster of the inserted supervised branch using a second clustering technique, the second clustering technique different from the first clustering technique, means for joining the first cluster and the second cluster to form a clustering block, the clustering block appended to an end of the supervised branch, and means for executing a propagation training strategy to modify a parameter of the machine learning model.

Example 18 includes the apparatus of example 17, wherein the first clustering technique includes spatial clustering.

Example 19 includes the apparatus of example 18, wherein the second clustering technique includes semantic clustering.

Example 20 includes the apparatus of example 17, wherein the means for executing is to cause a machine learning model trainer to train the machine learning model without including the inserted supervised branch and the clustering block, cause the machine learning model trainer to train the machine learning model including the inserted supervised branch and without including the clustering block, and cause the machine learning model trainer to train the machine learning model including the inserted supervised branch and the clustering block.

Example 21 includes the apparatus of example 20, further including means for providing the modified model to a model executor for execution.

Example 22 includes the apparatus of example 17, further including means for determining an amount of influence of the first cluster in the joining of the first cluster and the second cluster to form the clustering block.

Example 23 includes the apparatus of example 17, wherein the means for inserting is further to identify the location for insertion of the supervised branch in the machine learning model.

Example 24 includes the apparatus of example 23, wherein the means for inserting is to identify the location at a transition between layers of the machine learning model.

Example 25 includes a method of modifying a machine learning model, the method comprising inserting a supervised branch into a machine learning model at an identified location, generating a first cluster of the inserted supervised branch using a first clustering technique, generating a second cluster of the inserted supervised branch using a second clustering technique, the second clustering technique different from the first clustering technique, joining the first cluster and the second cluster to form a clustering block, the clustering block appended to an end of the supervised branch, and executing a propagation training strategy to modify a parameter of the machine learning model.

Example 26 includes the method of example 25, wherein the first clustering technique includes spatial clustering.

Example 27 includes the method of example 26, wherein the second clustering technique includes semantic clustering.

Example 28 includes the method of example 25, wherein the execution of the propagation training strategy includes training the machine learning model, without including the inserted supervised branch and the clustering block, training the machine learning model including the inserted supervised branch, without including the clustering block, and training the machine learning model including the inserted supervised branch and the clustering block.

Example 29 includes the method of example 25, further including providing the modified model to a model executor for execution.

Example 30 includes the method of example 25, further including performing progressive clustering to determine an amount of influence of the first cluster in the joining of the first cluster and the second cluster to form the clustering block.

Example 31 includes the method of example 25, further including identifying the location for insertion of the supervised branch in the machine learning model.

Example 32 includes the method of example 31, wherein the identifying of the location includes identifying a transition between layers of the machine learning model.

The following claims are hereby incorporated into this Detailed Description by this reference, with each claim standing on its own as a separate embodiment of the present disclosure.

What is claimed is:

1. An apparatus to modify a machine learning model, the apparatus comprising:
   interface circuitry;
   machine-readable instructions; and
   at least one processor circuit to be programmed by the machine-readable instructions to:
      identify a location of a machine learning model, the location intermediate to a first layer of the machine learning model and a second layer of the machine learning model, the location identified based on whether a first size of inputs for the first layer are different from a second size of inputs for the second layer;
      insert a supervised branch into the machine learning model at the identified location;
      generate a first cluster of the inserted supervised branch using a first clustering technique;
      generate a second cluster of the inserted supervised branch using a second clustering technique, the second clustering technique different from the first clustering technique;
      join the first cluster and the second cluster to form a joint clustering block, the joint clustering block appended to an end of the supervised branch;
      perform re-clustering of the joint clustering block based on a merging degree of spatial clustering and semantic clustering; and
      adjust the merging degree based on a first parameter and a second parameter, the merging degree determined using a depth of a layer of a backbone network associated with the joint clustering block.

2. The apparatus of claim 1, wherein the first clustering technique includes spatial clustering.

3. The apparatus of claim 2, wherein the second clustering technique includes semantic clustering.

4. The apparatus of claim 1, wherein one or more of the at least one processor circuit is to:
   train the machine learning model without including the inserted supervised branch and the joint clustering block;
   train the machine learning model including the inserted supervised branch and without including the joint clustering block; and
   train the machine learning model including the inserted supervised branch and the joint clustering block.

5. The apparatus of claim 1, wherein one or more of the at least one processor circuit is to provide the modified model to a model executor for execution.

6. The apparatus of claim 1, wherein one or more of the at least one processor circuit is to determine an amount of influence of the first cluster in the joining of the first cluster and the second cluster to form the joint clustering block.

7. The apparatus of claim 1, wherein the first parameter represents a number of top-ranked features with least errors in the secondary clustering.

8. The apparatus of claim 1, wherein the second parameter represents a distance threshold.

9. The apparatus of claim 1, wherein the supervised branch includes a first supervised branch and a second supervised branch, the first supervised branch including a first inserted layer, the first inserted layer having a same size as the second layer of the machine learning model.

10. At least one non-transitory machine readable medium comprising instructions that, when executed, cause at least one processor to at least:
    identify a location of a machine learning model, the location intermediate to a first layer of the machine learning model and a second layer of the machine learning model, the location identified based on whether a first size of inputs for the first layer are different from a second size of inputs for the second layer;
    insert a supervised branch into the machine learning model at the identified location;
    generate a first cluster of the inserted supervised branch using a first clustering technique;
    generate a second cluster of the inserted supervised branch using a second clustering technique, the second clustering technique different from the first clustering technique;
    join the first cluster and the second cluster to form a joint clustering block, the joint clustering block appended to an end of the supervised branch;
    perform re-clustering of the joint clustering block based on a merging degree of spatial clustering and semantic clustering; and
    adjust the merging degree based on a first parameter and a second parameter, the merging degree determined using a depth of a layer of a backbone network associated with the joint clustering block.

11. The at least one non-transitory machine readable medium of claim 10, wherein the first clustering technique includes spatial clustering.

12. The at least one non-transitory machine readable medium of claim 11, wherein the second clustering technique includes semantic clustering.

13. The at least one non-transitory machine readable medium of claim 10, wherein the instructions, when executed, cause the at least one processor to:
    train the machine learning model without including the inserted supervised branch and the joint clustering block;
    train the machine learning model including the inserted supervised branch and without including the joint clustering block; and
    train the machine learning model including the inserted supervised branch and the joint clustering block.

14. The at least one non-transitory machine readable medium of claim 10, wherein the instructions, when executed, cause the at least one processor to provide the modified model to a model executor for execution.

15. The at least one non-transitory machine readable medium of claim 10, wherein the instructions, when executed, cause the at least one processor to determine an amount of influence of the first cluster in the joining of the first cluster and the second cluster to form the joint clustering block.

16. A method of modifying a machine learning model, the method comprising:
- identifying a location within a machine learning model, the location intermediate to a first layer of the machine learning model and a second layer of the machine learning model, the location identified based on whether a first size of inputs for the first layer are different from a second size of inputs for the second layer;
- inserting a supervised branch into a machine learning model at an identified location;
- generating a first cluster of the inserted supervised branch using a spatial clustering technique;
- generating a second cluster of the inserted supervised branch using a semantic clustering technique;
- joining the first cluster and the second cluster to form a joint clustering block, the joint clustering block appended to an end of the supervised branch;
- performing re-clustering of the joint clustering block based on a merging degree of spatial clustering and semantic clustering; and
- adjusting the merging degree based on a first parameter and a second parameter, the merging degree determined using a depth of a layer of a backbone network associated with the joint clustering block.

17. The method of claim 16, further including:
- training the machine learning model without including the inserted supervised branch and the joint clustering block;
- training the machine learning model including the inserted supervised branch and without including the joint clustering block; and
- training the machine learning model including the inserted supervised branch and the joint clustering block.

18. The method of claim 16, further including providing the modified model to a model executor for execution.

19. The method of claim 16, further including determining an amount of influence of the first cluster in the joining of the first cluster and the second cluster to form the joint clustering block.

* * * * *

UNITED STATES PATENT AND TRADEMARK OFFICE
CERTIFICATE OF CORRECTION

| | | |
|---|---|---|
| PATENT NO. | : 12,437,181 B2 | Page 1 of 1 |
| APPLICATION NO. | : 17/041340 | |
| DATED | : October 7, 2025 | |
| INVENTOR(S) | : Yao et al. | |

It is certified that error appears in the above-identified patent and that said Letters Patent is hereby corrected as shown below:

In the Claims

Column 22, Claim 7, Line 10, Delete: "secondary"

Signed and Sealed this
Twenty-fifth Day of November, 2025

John A. Squires
*Director of the United States Patent and Trademark Office*